United States Patent
Tighe et al.

(10) Patent No.: US 9,355,469 B2
(45) Date of Patent: May 31, 2016

(54) MODE-BASED GRAPHICAL EDITING

(75) Inventors: Joseph Tighe, Chapel Hill, NC (US);
Anmol Dhawan, Ghaziabad (IN);
Richard Coencas, San Jose, CA (US);
Gregg D. Wilensky, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1143 days.

(21) Appl. No.: 12/351,760

(22) Filed: Jan. 9, 2009

(65) Prior Publication Data

US 2013/0167087 A1 Jun. 27, 2013

(51) Int. Cl.
*G06F 3/048* (2013.01)
*G06T 11/00* (2006.01)
*G06T 11/20* (2006.01)
*G06F 3/0481* (2013.01)

(52) U.S. Cl.
CPC .............. *G06T 11/00* (2013.01); *G06F 3/0481* (2013.01); *G06T 11/20* (2013.01)

(58) Field of Classification Search
CPC ................................. G06T 11/20; G06T 11/00
USPC .......................................... 715/825, 781, 811
See application file for complete search history.

(56) References Cited

U.S. PATENT DOCUMENTS

| | | | |
|---|---|---|---|
| 5,668,888 A | 9/1997 | Doi et al. | |
| 5,710,830 A | 1/1998 | Holeva | |
| 5,768,413 A | 6/1998 | Levin et al. | |
| 5,771,308 A | 6/1998 | Florent | |
| 6,021,222 A | 2/2000 | Yamagata | |
| 6,167,167 A | 12/2000 | Matsugu et al. | |
| 6,208,763 B1 | 3/2001 | Avinash | |
| 6,256,411 B1 | 7/2001 | Iida | |
| 6,337,925 B1 | 1/2002 | Cohen | |
| 6,400,831 B2 | 6/2002 | Lee et al. | |
| 6,456,297 B1 | 9/2002 | Wilensky | |
| 6,529,910 B1 * | 3/2003 | Fleskes .......................... | 707/770 |
| 6,546,117 B1 | 4/2003 | Sun et al. | |
| 6,560,633 B1 * | 5/2003 | Roberts et al. ................. | 709/202 |
| 6,590,584 B1 * | 7/2003 | Yamaura et al. ............... | 715/704 |
| 6,674,955 B2 | 1/2004 | Matsui et al. | |
| 6,778,690 B1 | 8/2004 | Ladak et al. | |

(Continued)

FOREIGN PATENT DOCUMENTS

EP 1720128 A2 11/2006
WO WO01/86375 A3 11/2001

(Continued)

OTHER PUBLICATIONS

Laurie Ulrich Fuller, Photoshop CS3 Bible, Jul. 10, 2007, John Wiley & Sons.*

(Continued)

*Primary Examiner* — William Bashore
*Assistant Examiner* — Nathan Shrewsbury
(74) *Attorney, Agent, or Firm* — Wolfe-SBMC

(57) ABSTRACT

Among other disclosures, a method includes associating an initial work area corresponding to a portion of graphical data with a graphical editing tool, receiving a request indicating a change in editing mode to use of the graphical editing tool, determining an active work area based on the initial work area associated with the graphical editing tool, and selecting the active work area, at least initially, for editing using the graphical editing tool.

21 Claims, 7 Drawing Sheets

(56) References Cited

U.S. PATENT DOCUMENTS

| | | | |
|---|---|---|---|
| 6,809,742 B1* | 10/2004 | Motosugi et al. | 345/619 |
| 6,850,252 B1 | 2/2005 | Hoffberg | |
| 6,857,105 B1* | 2/2005 | Fox et al. | 715/825 |
| 6,983,081 B2 | 1/2006 | Chen | |
| 7,024,039 B2 | 4/2006 | Simard et al. | |
| 7,245,766 B2 | 7/2007 | Brown et al. | |
| 7,316,003 B1* | 1/2008 | Dulepet et al. | 717/111 |
| 7,400,767 B2 | 7/2008 | Slabaugh et al. | |
| 7,430,339 B2 | 9/2008 | Rother et al. | |
| 7,978,618 B2* | 7/2011 | Richardson et al. | 370/252 |
| 2001/0049704 A1 | 12/2001 | Hamburg et al. | 707/530 |
| 2002/0118875 A1 | 8/2002 | Wilensky | |
| 2002/0130908 A1 | 9/2002 | Wilensky | |
| 2002/0136453 A1 | 9/2002 | Aggarwal et al. | |
| 2003/0026479 A1 | 2/2003 | Thomas et al. | |
| 2003/0074634 A1* | 4/2003 | Emmelmann | 715/513 |
| 2003/0099411 A1 | 5/2003 | Kokemohr | |
| 2003/0202697 A1 | 10/2003 | Simard et al. | |
| 2003/0202699 A1 | 10/2003 | Simard et al. | |
| 2004/0037476 A1 | 2/2004 | Chen | |
| 2004/0148576 A1* | 7/2004 | Matveyenko et al. | 715/530 |
| 2004/0205567 A1* | 10/2004 | Nielsen | 715/513 |
| 2004/0217985 A9* | 11/2004 | Ries et al. | 345/740 |
| 2004/0268231 A1* | 12/2004 | Tunning | 715/513 |
| 2005/0025320 A1 | 2/2005 | Barry | |
| 2005/0102629 A1* | 5/2005 | Chen et al. | 715/770 |
| 2005/0128518 A1* | 6/2005 | Tsue et al. | 358/1.15 |
| 2006/0173985 A1 | 8/2006 | Moore | |
| 2007/0157078 A1* | 7/2007 | Anderson | 715/513 |
| 2007/0189708 A1* | 8/2007 | Lerman et al. | 386/52 |
| 2007/0208751 A1* | 9/2007 | Cowan et al. | 707/10 |
| 2009/0006451 A1* | 1/2009 | Estrada | 707/102 |
| 2010/0281385 A1* | 11/2010 | Meaney | G06F 3/048 715/731 |

FOREIGN PATENT DOCUMENTS

| | | |
|---|---|---|
| WO | WO2004/031991 A1 | 4/2004 |
| WO | WO2006/028460 | 3/2006 |
| WO | WO2008/051783 A2 | 5/2008 |
| WO | WO2009/070450 A2 | 6/2008 |

OTHER PUBLICATIONS

Microsoft, Microsoft Office Word 2003, 2003, Microsoft Corporation, Microsoft Office Professional Edition 2003.*

Photoshop CS3 Bible, by Laurie Ulrich Fuller, Jul. 10, 2007 (John Wiley & Sons) p. 402.*

"Adobe Photoshop CS: The New Color Replacement Tool", The National Association of Photoshop Professionals (2004), 2 pages.

"Digital Photography Review", Adobe Photoshop CS Review p. 1, Operation , 3 pages.

"Digital Photography Review", Adobe Photoshop CS Review p. 2, Operation , 3 pages.

"Digital Photography Review", Adobe Photoshop CS Review p. 3, Operation , 3 pages.

"Digital Photography Review", Adobe Photoshop CS Review p. 4, Operation , 3 pages.

"Evaluation Guide", Extensis, Mask Pro 3, Unmatched Masking Power and Precision, (2003), 29 pages.

"Extensis Mask Pro 3 Users Guide", (2003), 53 pages.

"Getting Started with Adobe Photos hop 6.0", ITS Training, Short Course (Sep. 27, 2001), 18 pages.

"How to Fix Red Eyes", Adobe Photoshop CS with Adobe ImageRead~ CS, Adobe Photoshop CS Help,1 page.

"Image Enhancement—Understanding the Basics of Photoshop", UPENN, Department of City & Regional Planning, Planning Support System Fall 2003 (2003), 24 pages.

"Photoshop—Layer Basics", Adobe Photoshop, 8 pages.

"The Professional Standard in Desktop Digital Imaging", Adobe Photoshop cs, Features, (Sep. 2003), 6 pages.

"Unmatched Masking Power & Precision", Extensis Masko Pro 3: more Control and Precision for Unmatched Masking Results (2003},1 page.

"Using Layer Comps", Adobe Photoshop CS Tutorial,(2003), 2 pages.

"Using the Color Replacement Tool", 2 pages.

"Using the Healing Brush tool (Photoshop)", 2 pages.

"Working with Selections", Adobe Photoshop 5.0. Tutorial excerpted from Adobe Photoshop Classroom in a Book,(1998). 14 pages, (B015 IDS Mar. 9. 2009).

Bockaert, Vincent, "Digital Photography Review", Adobe Photoshop CS Review p. 1 Operation (Sep. 2003), 3 pages.

Boykov et al., "Interactive Graph Cuts for Optimal Boundary & Region Segmentation of Objects in N-D Images," Proceedings of International Conference on Computer Vision, Vancouver, Canada, Jul. 2001, 8 pages.

Comaniciu, Dorin, et al., "Kernel-Based Object Tracking", 2000 IEEE Conference on Com outer Vision and Pattern Recognition, 30 pages.

Comaniciu, Dorin, et al., "Robust Detection and Tracking of Human Faces with an Active Camera", 2000 IEEE 0-7695-0698-04/00,(2000), 8 pages.

Comanisiu, Dorin, et al., "Real-Time Tracking of Non-Rigid Objects using Mean Shift", IEEE CVPR 2000 (2000), 8 pages.

Dastouri, Mehrdad, Authorized Officer, PCT Office, PCT Application No. PCT/US01/11809, filed Apr. 10, 2001, in International Search Report, mailed Nov. 16, 2001, 2 pages.

Geman et al., "Stochastic Relaxation, Gibbs Distributions, and the Bayesian Restoration of Images," IEEE Transactions on Patterns Analysis and Machine Intelligence, vol. PAMI-6, No. 6, Nov. 1984, pp. 721-744.

International Application Serial No. PCT/US2007/085244, International Search Report, mailed Mar. 4, 2009, 4 pages.

International Application Serial No. PCT/US07/81739, International Search Report, mailed May 2, 2008, 4 pages.

Kelby, Scott , "Retouching Tips: Enhancing Eyes, Eyelashed, and More!", Adobe Photoshop CS, Tutorial (2003), 3 pages.

Kincaid, Kristine L., Authorized Officer, PCT Office, PCT Patent application No. PCT/US04/029149, filed Sep. 7, 2004, in International Search Report, mailed Mar. 23, 2006, 2 pages.

Kohli et al., Efficiently Solving Dynamic Markov Random Fields Using Graph Cuts, 2005, ICCV, Tenth IEEE International Conference on Computer Vision, 8 pages.

Levy, P. "Context-Free Grammar," U.S. Appl. No. 11/584,217, filed Oct. 20, 2006, to be published by the USPTO, 80 pages.

Lombaert et al., "A Multilevel Banded Graph Cuts Method for Fast Image Segmentation," Proceedings of the Tenth IEEE International Conference on Computer Vision (ICCV 2005), 8 pages.

Mortensen et al., "Interactive Segmentation with Intelligent Scissors," Graphical Models and Image Processing, 60:349-384 (1998) 36 pages.

Reese, L. J., "Intelligent Paint: Region-Based Interactive Image Segmentation," Aug. 1999, Thesis Submitted to Brigham Young University, Department of Computer Science, to be published by the USPTO, 160 pages.

Tan, K. H, et al., "Selecting Objects with freehand sketches", Proceedings of the eight IEEE International Conference on computer vision;vol. 1, (Jul. 7, 2001), 337-344.

Veillard, Jacques, Authorized Officer, PCT Office, PCT International Application No. PCT/US2002/031258, filed Sep. 30, 2002, in International Search Report mailed Jan. 28, 2003, 3 pages.

Vu, Tranh T., Examiner, U.S. Patent Office, U.S. Appl. No. 10/984,465, filed Nov. 9, 2004, in Office Action mailed Dec. 23, 2008, 16 pages.

Vu, Tranh T., Examiner, U.S. Patent Office, U.S. Appl. No. 10/984,465, filed Nov. 9, 2004, in Office Action mailed Jul. 13, 2009, 16 pages.

Vu, Tranh T., Examiner, U.S. Patent Office, U.S. Appl. No. 10/984,465, filed Nov. 9, 2004, in Office Action mailed Jun. 23, 2008, 16 pages.

(56) References Cited

OTHER PUBLICATIONS

Wang, A., et al., "On fast FIR filters implemented as tail-canceling IIR filters", IEEE Transactions on [see also Acoustics, Speech, and Signal Processing, IEEE Transactions on] Signal Processing 45(6), (Jun. 1997), pp. 1415-1427.

Wang et al., "An Iterative Optimization Approach for Unified Image Segmentation and Matting," Proceedings of the Tenth IEEE International Conference on Computer Vision (ICCV 2005), 8 pages.

Wilensky, Gregg D., Localization of Activity With Respect to Digital Data, U.S. Appl. No. 10/984,465, filed Nov. 9, 2004, to be published by the USPTO, 74 pages.

Yahia, H. M, et al., "Fast & robust level-set segmentation of deformable structures", Acoustics, Speech and signal processing, 1998, Proceedings of the 1998 IEEE International Conference in Seattle, vol. 5, (May 12, 1998), 2765-2768.

U.S. Appl. No. 10/984,465, response filed Oct. 15, 2008 to Non-Final Office Action mailed Jun. 23, 2008, 28 pgs.

U.S. Appl. No. 10/984,465, response filed Mar. 23, 2009 to Final Office Action mailed Jun. 23, 2008, 22 pages.

U.S. Appl. No. 10/984,465, response filed Nov. 13, 2009 to Non-Final Office Action mailed Jul. 13, 2009, 25 pages.

"Color Replacement: Photoshop CS", PSDesigns v.3.0, Heathrowe. com , 4 pages.

Bontcheva, K., et al., "Evolving GATE to Meet New Challenges in Language Engineering", In natural language engineering vol. 10 (3-4), (Feb. 12, 2004), 349-373.

Mortensen. E. N., Toboggan-Based Intelligent Scissors with a Four•Parameter Edge Model, Computer Vision and Pattern Recognition (CVPR) 1999, 7 pages.

\* cited by examiner

MODE-BASED GRAPHICAL EDITING

BACKGROUND

The present disclosure relates to mode-based graphical editing.

Performing activities (e.g., adjustments, modifications, editing, etc.) related to graphical data is facilitated by image editors. Editors can provide a user interface through which a user interacts with the editor. Editors can include graphical tools that manipulate graphical data. The user interface can display the graphical data being edited as well as graphical tools available. A user can interact with the editor using a mouse, keyboard and other devices based on onscreen cursors (e.g., an arrow associated with movement of a mouse).

Computer systems can have modes. Modes are distinct configurations that can affect how a system behaves. A common example of a computer mode is the Caps Lock key on keyboards, which toggles whether entered characters are interpreted as upper- or lowercase. Another example of modes is the Single player vs. Multiplayer choice in video games. In single-player mode only one person can play the game, while in multiplayer mode, two or more players can play simultaneously.

SUMMARY

This specification describes technologies relating to mode-based graphical editing.

In general, one aspect of the subject matter described in this specification can be embodied in a method, implemented by a computer programmed to provide tools for graphical editing of image data, that includes associating an initial work area corresponding to a portion of graphical data with a graphical editing tool; receiving a request indicating a change in editing mode to use of the graphical editing tool; determining an active work area based on the initial work area associated with the graphical editing tool; and selecting the active work area, at least initially, for editing using the graphical editing tool.

These and other embodiments can optionally include one or more of the following features. The method can include receiving a request to apply the graphical editing tool, relative to the initial work area, where the associating is in response to the receiving the request to apply the graphical editing tool. The active work area can include a second active work area, and the receiving can include receiving the request when a first active work area is selected for editing. The associating can include associating the initial work with a graphical editing tool that applies a predetermined set of graphical operations. The predetermined set of graphical operations can include a set configurable by an end user. The receiving can include receiving the request explicitly indicating the change in editing mode. The receiving can include receiving the request indicating the change in editing mode from a first editing mode to a second editing mode differing in complexity. The method can also include displaying a visual indication of one of the initial work area or the active work area.

Particular embodiments of the invention can be implemented to realize one or more of the following advantages. An image editor user can be intuitively return to a desired context without having to take the steps generally associated with establishing a context. For example, if a user applies a sky tool to an image in a simplified editing mode, when the user switches to a more complex mode and selects the sky tool again, the user can be provided with an editing region corresponding to the same region previously edited with the tool. Thus, the editing experience can be more efficient.

Certain implementations can provide tools for which associations are created with work areas, and also provide tools for which no associations are created. Thus, the editing experience can be flexibly configured to provide an experience dependant on the type of use.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
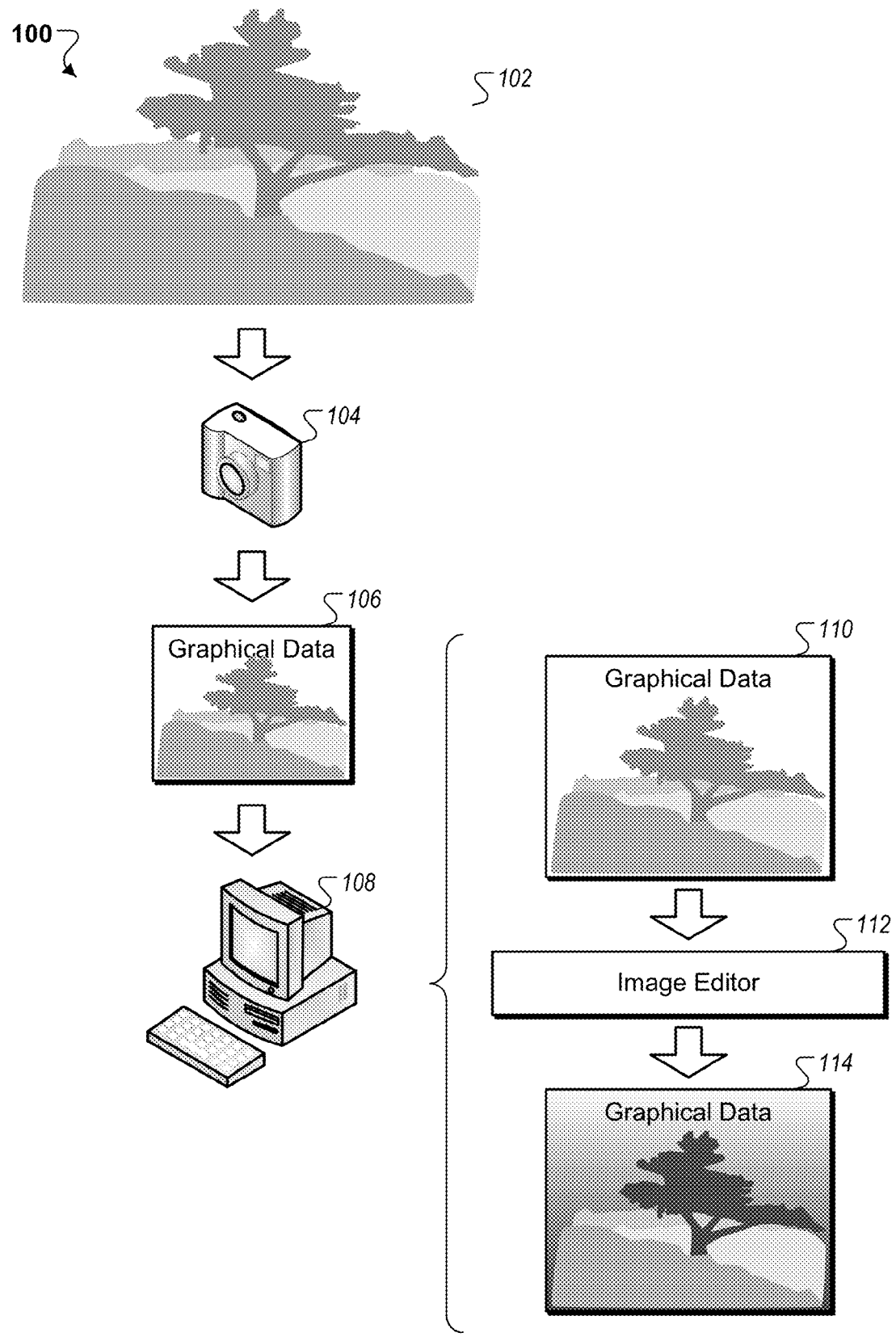
FIG. 1 is a conceptual diagram showing an example overview of editing graphical data.

FIG. 1 is a conceptual diagram 100 showing an example overview of editing graphical data. In general, graphical data can include photographs, such as of a person, animal or landscape. Graphical data can also include non-photographic graphics, such as buttons, banners, or text, or a combination of photographic and non-photographic elements. Once produced, graphical data can be loaded onto a computer and edited. Editing graphical data can include adding elements (e.g., additional photographic material), deleting portions of data (e.g., cropping or replacing data with a solid color), or making other adjustments (e.g., changes to contrast level, brightening, or replacing color families).

As shown in FIG. 1, a scenic landscape 102 can be photographed with a camera 104. Photographs can depict many types of subject matter, such as a landscape 102, people, cars, or commercial products. Cameras, such as the camera 104, can include digital cameras. A digital camera, sometimes referred to as a "digicam," can digitally take video, still photographs, or both using an electronic image sensor. Often thousands of images can be recorded on a single small memory device. Digital cameras are incorporated into many electronic devices ranging from personal digital assistants (PDAs) and mobile phones to vehicles.

Images are recorded as graphical data 106. The graphical data 106 can include data that represents the subject photographed. In addition, the data 106 can include metadata about the image, such as the date and time a photograph was taken. Often the graphical data 106 can be loaded on a computer 108 for viewing and editing. The computer 108 can include various mechanisms for receiving the graphical data 106 from the camera 104. For example, a Universal Serial Bus (USB)

interface (not shown) can provide a mechanism by which the graphical data 106 from the camera is transferred to the computer 108.

On the computer 108, graphical data 110 can be stored independently from the camera 104, such as on a hard drive. On the computer 108, the graphical data 110 can be stored as a file in an operating system, and subsequently viewed or edited. An electronic image (which for brevity will simply be referred to as an image) does not necessarily correspond to a file. An image may be stored in a portion of a file that holds other images, in a single file dedicated to the image in question, or in multiple coordinated files.

The graphical data 110 can be stored using a form of compression, such as lossless or lossy compression, that reduces the storage space required for the data 110 (e.g., as with JPEG files). The graphical data 110 can also be stored without compression.

On the computer 108, an image editor 112, can be a software application capable of loading the graphical data 110, displaying the data 110, allowing a user the alter the data 110, and then save the modified graphical data 114. For example, the original image 110, can be washed out because of non-optimal lighting when the photograph was taken by the camera 104. In the image editor 112, the adverse lighting effects can be reduced or eliminated, using various graphical tools. As a result, a corrected image 114, which is more pleasing to the eye, can be created.

Figure 2:
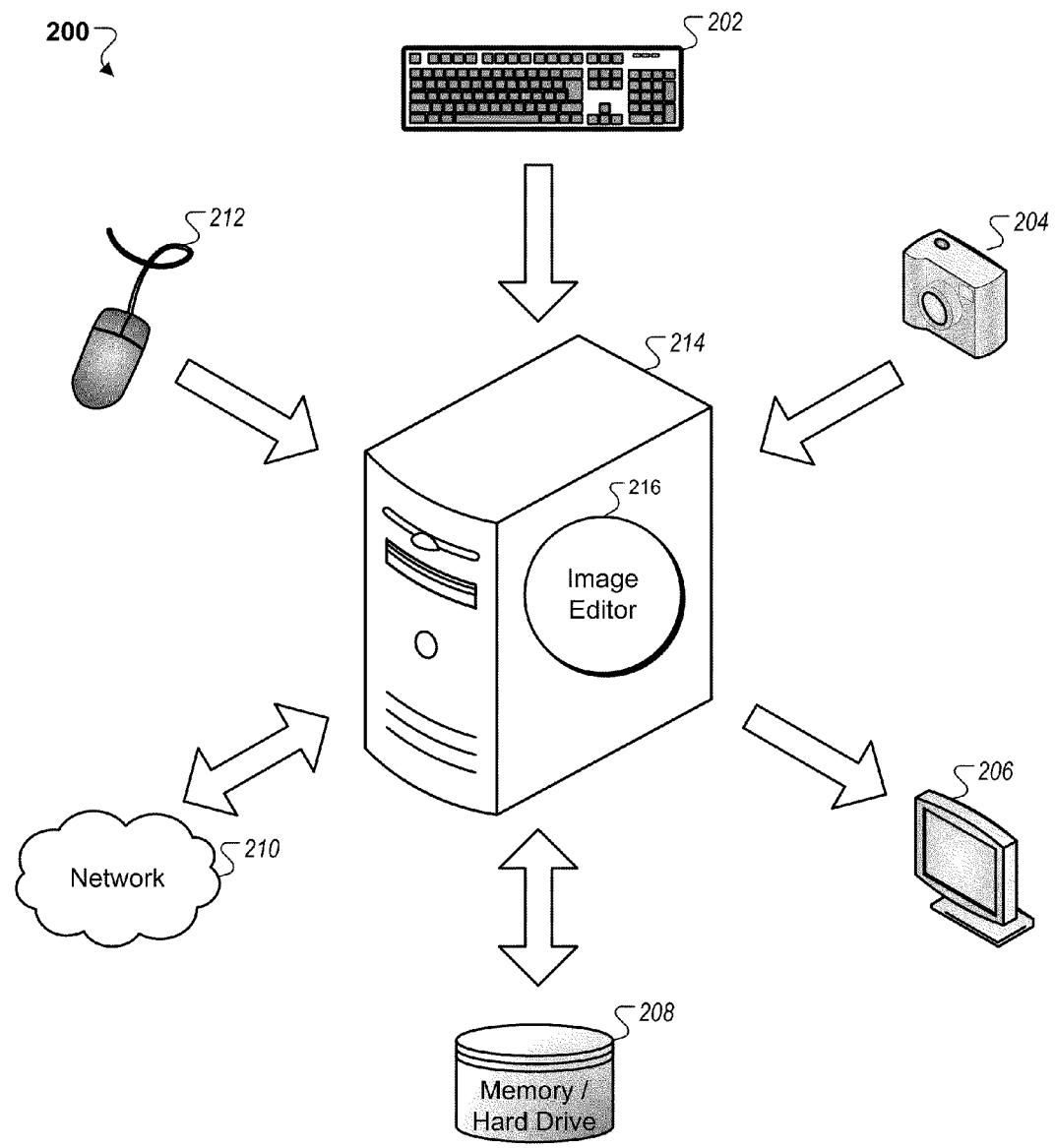
FIG. 2 is a system diagram showing interactions between a computer and components.

FIG. 2 is a system diagram 200 showing interactions between a computer and components. The computer 214 can enable software applications to run, providing varied functionality. The computer 214 can be attached to various components allowing for input and output of data as well as interaction with the data.

As shown in FIG. 2, the computer 214 includes an image editor application 216. The editor 216 can run on the computer 214 and receive input from components or provide output to the components via the computer 214. The computer 214 can include memory and a processor (not shown) enabling applications, such as the editor 216, to execute.

When using the image editor 216, a user can control the editor using input devices, such as a mouse 212 or keyboard 202. Other devices through which a user can control operations of the editor 216 include touchscreens, light pens, trackballs and graphics tablets. Using the mouse 212, or other pointing device, a user can control the onscreen movements of a cursor. The cursor can be used to interact with a graphical user interface of the image editor 216.

Using the keyboard 202, a user can input text into the editor 216 to be represented by the graphical data (e.g., a copyright notice or photographer attribution). The keyboard 202 can also be used to perform keyboard shortcuts, such as selecting a menu item or graphical tool. A shortcut can oftentimes achieve the same functionality as several steps using the mouse 212. For example, a keyboard shortcut can select the same command as clicking on a menu name to open the menu, and then clicking on an item within the menu.

The computer 214 can also be connected to a camera 204 using, for example, a USB or Institute of Electrical and Electronics Engineers (IEEE) standard 1394 (e.g., FireWire, i.Link, or Lynx) interface. Graphical data, such as photographs, can be transferred from storage in the camera 204 to the computer 214, and then opened and modified in the image editor 216.

The computer 214 can include a display 206 enabling a user to see or otherwise perceive (e.g., through touch as with a Braille terminal) output from the computer 214. The output shown on the display 206 can reflect input by the user, such as the movement of a cursor by a mouse 212, or modifications to graphical data requested by the user using the image editor 216.

The computer 214 can include access to electronic storage 208, such as memory or a hard drive. Many computers include a hard drive. However, a hard drive can also be external to the computer 214. In addition, the computer 214 can be connected to electronic storage 208 that is located remotely from the computer 214. In addition, when the image editor 216 loads an image from a hard drive, the image can be fully or partially loaded in volatile electronic storage 208 (e.g., random-access memory [RAM]). Often such electronic storage 208 provides improved performance to the image editor 216 during operations on the data which can then be save to non-volatile electronic storage 208.

The computer 214 can also include an interface to a network 210, such as the Internet or a corporate wide area network (WAN). The image editor 216, through the computer's interface with the network 210, can store graphical data remotely in electronic storage 208. The editor 216 can also request and receive updates or additions to its software. A user can share graphical data, using the image editor 216, with others on the network 210.

Figure 3:
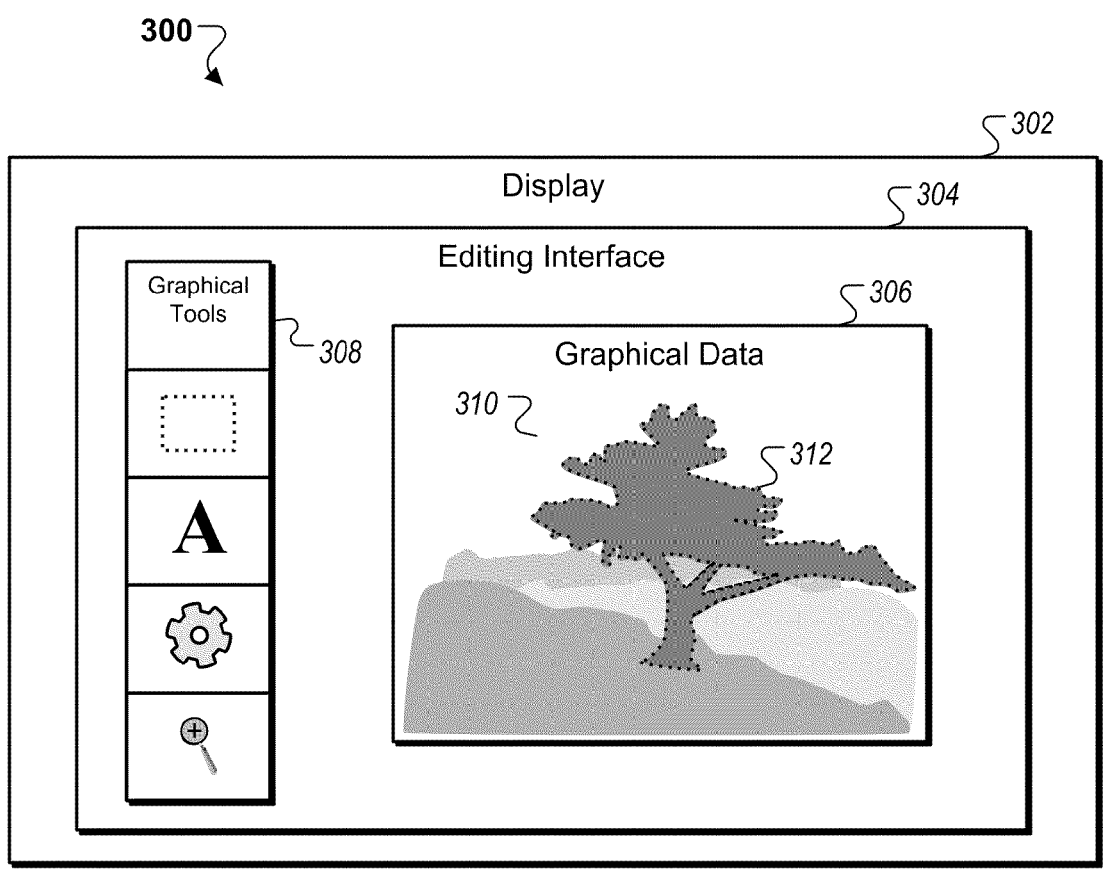
FIG. 3 is a block diagram showing an example interface for editing graphical data.

FIG. 3 is a block diagram 300 showing an example interface for editing graphical data. An image editor, such as the editor 216, in FIG. 2, can have a graphical user interface. A graphical user interface (GUI) allows a person to interact with a computer (e.g., desktop and laptop computers and handheld devices). A GUI can offer graphical icons and other visual indications, enabling a user to see output (e.g., messages or responses) as well as representations of a user's input (e.g., movement of a cursor with a mouse).

As shown in FIG. 3, a display 302 can include an editing interface 304 for an image editor. The editing interface 304 can be window-based, allowing interaction with the interfaces of more than one application.

The editing interface 304 can also provide tools 308 that can be selected by a user and applied to graphical data 306. The graphical tools 308 can include various kinds of operations. Some of the graphical tools 308 can specify types of modifications to graphical data. Other graphical tools 308 can provide for enhanced interaction with the graphical data 306 and other editing tools 308. For example, some graphical tools 308 may relate to selecting a portion of the graphical data 306 to which another of the graphical tools 308 will be applied. Graphical tools 308 can also provide for copying or deleting of portions of the graphical data 306.

The graphical data 306 can include a photograph. For example, the graphical data 306 can include a representation of a landscape 310. In addition, the graphical data 306 can include representations of non-photographic graphics (e.g., digital paintings or text). The graphical data 306 can also include data relating to how graphical representations in the data should be displayed (e.g., color palettes or color modes).

Using one of the graphical tools 308, a user can select a work area 312, corresponding to a portion of the graphical data 306. The work area 312 can be shaped like a rectangle, ellipse, or many other regular and irregular shapes. The work area 312 can also include non-contiguous areas, separated by regions not associated with the work area 312. For example, a work area 312 can correspond to two circular areas of the graphical data 306 that are non-overlapping. In FIG. 3, the work area 312 corresponds to a tree, and is shaped like the tree represented by the graphical data 306.

The work area 312 can also be a selection of a portion of original graphical data 306. Changes applied to the work area 312, such as with the tools 308, can alter the actual graphical data 306.

Alternatively, the work area 312 can correspond to a portion of the graphical data 306, but include a copy of the graphical data 306, or a layer, corresponding to the work area 312. Changes applied to the work area 312 can alter the copy associated with the work area 312 rather than the actual graphical data 306. The altered copy can also be displayed in the interface 304 in the same location as the underlying original graphical data 306. As such, the adjustment applied can appear to have taken effect to the original graphical data 306, although the original graphical data 306 is preserved beneath the layer.

The work area 312 can be indicated visually relative to the graphical data 306. For example, the work area 312 can include a dashed border or marquee selection (i.e., marching ants). The indication, as depicted in FIG. 3 relative to the work area 312, can help a user to easily see what corresponds to the work area 312 out of the graphical data 306. Alternatively, the work area 312 can include no visual indication of its relative to the graphical data 306. A user can be given the option of selectively displaying the indication.

Selecting the work area 312 can provide a way of limiting the effect of tools 308 applied to the graphical data 306. For example, given that work area 312 corresponds to the tree, a darkening adjustment can apply to just the work area 312, thus darkening the tree, rather than the remainder of the graphical data 306.

Figure 4:
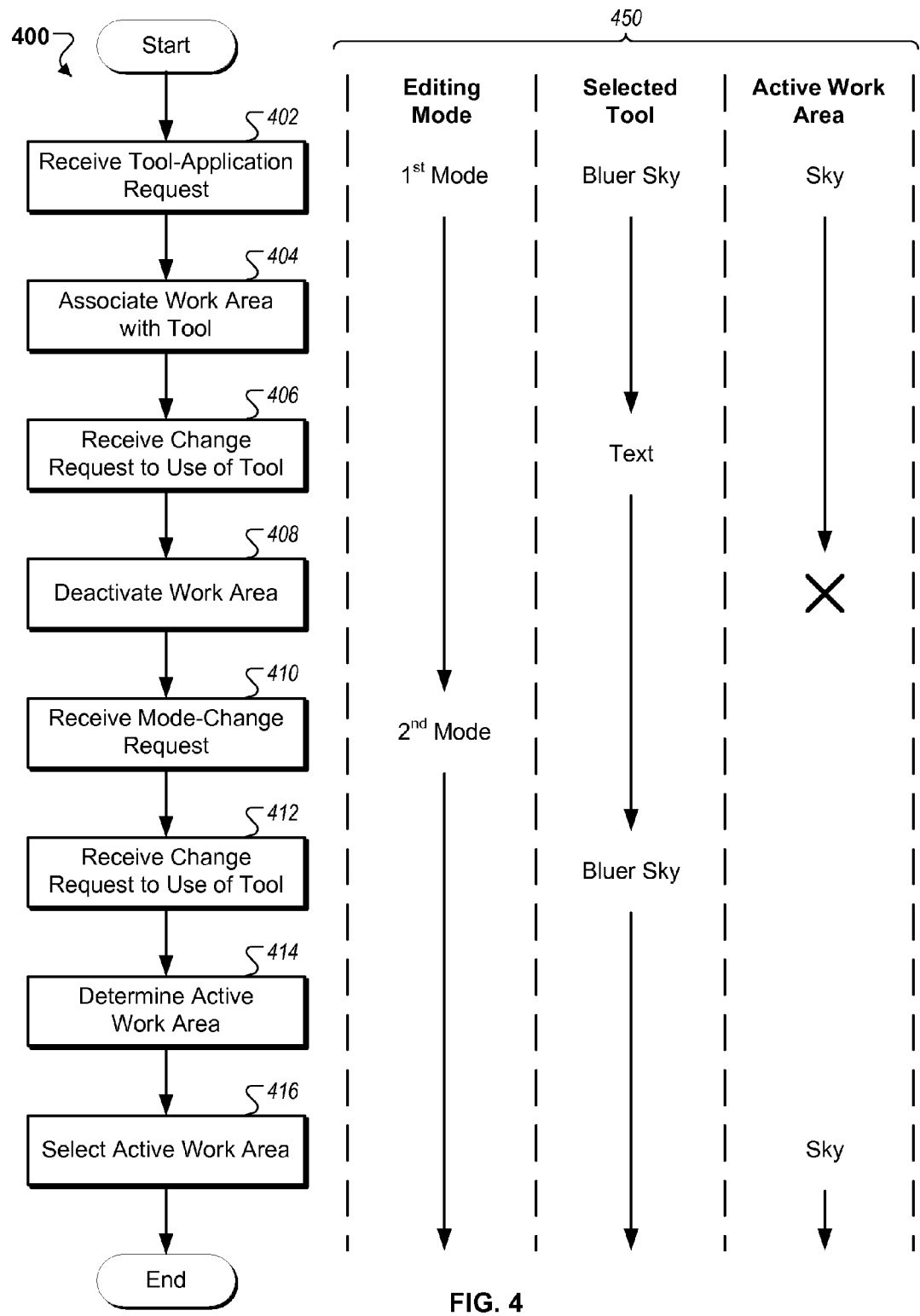
FIG. 4 is a flow diagram showing an example process for mode-based graphical editing with corresponding exemplary state information.

FIG. 4 is a flow diagram showing an example process 400 for mode-based graphical editing with corresponding exemplary state information 450. In general, when editing images, modes can provide a useful way of interacting with an editor. For example, a user may not have much experience editing photographs and be confused by having many editing options. Therefore, a simplified editing mode, providing easy access to the most commonly used operations, can prevent a user from being overwhelmed using the editor. Even experienced users can benefit from a simplified interface when making quick edits, or when just using options available in the simplified mode. However, many novice users quickly learn and gain confidence in image editing. A user may want additional editing options not provided in a simple interface. In such a situation, an option to change to a mode having a full array of options can avoid a user outgrowing an editor.

Use of modes need not be determined by a user's experience level. An editing approach involving multiple modes can provide for an efficient editing experience. For example, an experienced user can start in a simplified interface to perform standard graphical operations on an image. After these, the user can find the results satisfactory and end the editing session without needing to use a more complex interface. On the other hand, after applying standard operations on the image, the user may then want to more precisely refine the changes and switch modes. Thus, through mode-based graphical editing, the efficiency of simplified editing can be combined with the control available from many powerful graphical tools.

Editing modes can differ in complexity such that more editing options are available in one mode than another. Editing modes, however, need not differ in complexity. For example, a mode change can be simply choosing a different graphical tool.

Furthermore, in general, graphical tools can be associated with work areas to which the tools have been applied. For example, a user may use a first tool to edit a portion of an image. In response to the editing, an image editor can associate the portion of the image with the tool. The user can then choose a second tool and edit another portion of the image. When the user switches back to the first tool, the association between the tool and the portion of the image edited, can allow the editor to select the portion again. The user can benefit from not having to take the additional step of reselecting the portion previously modified.

In addition, precisely reselecting a portion of graphical data can be difficult for a user. For example, if a tool creates a selection while it is being applied, in order to reselect an exact area, a user may have to exactly replicate the action used when the tool was initially applied. An editor precisely storing the details of an earlier selection can allow a reselection to be made precisely. The programmatic reselection can avoid problems arising from a user intending to modify a portion of data previously modified but instead modifying a slightly different portion of data.

An editor can also remember associations between a tool and multiple work areas. A user interface can allow a user to choose which of several work areas previously modified with the tool are to be selected when the tool is chosen. By default, an application can select the most recently modified work area but can provide the option of selecting instead different associated work areas. Thus, a user can benefit from the improved efficiency of skipping the selection step as well as the flexibility of being able to reselect a non-default work area instead. In addition, when many work areas have been created relative to graphical data, providing a small subset of all the work areas based on work areas associated with a given tool can make choosing the appropriate work area straightforward and less prone to user error.

As shown in FIG. 4, the process 400, at 402, receives a tool-application request. For example, the process 400 can receive a request to paint using a paintbrush tool, or fill a region using a fill tool. The process 400 can receive the request with respect to a particular portion of graphical data. Application of a tool can be localized to graphical data near a mouse cursor (e.g., with a paintbrush tool), or localized to a region such that an operation applies across the whole region (e.g., with a fill tool). Tools that automatically enhance photographs can, for example, be applied generally to an entire image.

In addition to the various operations of the process 400, exemplary state information 450 can correspond to state changes introduced by the process 400. When the tool-application request is received, at 402, the process 400 is in a $1^{st}$ Mode editing mode, a particular tool, Bluer Sky, is selected and a work area, Sky, is active. The $1^{st}$ Mode can be a simplified editing mode, a full editing mode, or another type of mode.

The Bluer Sky tool can be a localized tool, in which case, the Sky work area can correspond to a portion of the graphical data proximate to where the Bluer Sky tool is applied. For example, the Bluer Sky tool can be based on a painting metaphor. As the user paints the sky with a brush, the editor can determine the portion of the graphical data that represents the sky, and create the Sky work area. Alternatively, the Sky work area can correspond to a portion of the graphical data without respect to a tool application location. For example, a user may apply a red-eye reduction tool that determines where representations of eyes are within the graphical data without the user clicking on or near eyes. The Sky work area can include a copy of the graphical data, such as a layer, so that operations to the work area do not alter the original graphical data itself.

Graphical operations resulting from the process 400, at 402, receiving the request to apply the Bluer Sky tool can be performed on the active work area, Sky. Applying the tool can resulting in selection of a region of the graphical data representing sky and creation of the Sky work area based on the selection. Alternatively, the Sky work area may have been created prior to the process 400, at 402, receiving the tool-application request.

In photos, sky can appear washed out and less blue than in reality due to limitations in photographic equipment. The Bluer Sky tool can, for example, perform operations, or a set of operations, designed to correct typical problems related to photographs depicting skies. On the other hand, the Bluer Sky tool can create a dramatic effect not meant to approximate the reality upon which the photograph is based.

The process 400, at 404, associates a work area, such as Sky, with the graphical tool, such as Bluer Sky. Associating the tool and work area can include storing the association in memory for later retrieval. The user can be unaware of the association and not need to do anything beyond applying the tool to associate the tool and the work area. The process 400, at 404, does not alter the exemplary state information 450.

The process 400, at 406, receives a request indicating a change in edit mode to use of a different graphical editing tool. The process 400 can receive the request as a result of a user clicking on a tool icon in a toolbar providing various tool options. The tool can be, e.g., a paintbrush tool, a tool for selecting a region of graphical data, or a fill tool. In the exemplary state information 450, the process 400, at 406, receives a request indicating a change to use of the Text tool. The Text tool can be a tool for applying text to an image (e.g., to indicate copyright information or provide an image caption). When the Text tool is selected, the Sky work area is the active work area.

Based on the request indicating a change to use of the tool, the process 400, at 408, can deactivate the work area. Generally, a work area can only be modified when selected.

However, note that multiple work areas can correspond to the same graphical data. When a work area is active, overlapping work areas can remain unchanged when the work area is modified. For example, the Sky work area can correspond to a portion of graphical data representing sky. A user, or an image editor, can create another work area overlapping Sky on which to apply another tool (e.g., to paint a bird representation). When the new work area is modified, the Sky work area and the original graphical data can remain unchanged. If the new work area is then deleted or hidden, Sky can appear the same as before the new work area was created.

In the exemplary state information 450, the process 400, at 408, deactivates the Sky work area based on the request to change to use of the Text tool, at 406. When the Text tool is applied (not shown in the process 400), since Sky is not active, the modifications can affect a new work area created for the text rather than Sky. The new work area can overlap Sky, however, such as if text is placed over the representation of sky in the graphical data.

Thus, work areas can allow organization of modifications. Work areas can also provide robustness in editing as prior modifications can be adjusted or deleted at any point without affecting changes associated with other work areas. At the same time, work areas can allow for freedom in placement of modifications relative to the graphical data.

The process 400, at 410, receives a mode-change request. The request can originate as an explicit request from a user clicking on a button in a user interface indicating a new mode. The request can also be implicit in another action. For example, receiving the request indicating a change in editing mode to use of an editing tool can include an implicit mode-change request.

With respect to the exemplary state information 450, the process 400, at 410, receives a request to change from the $1^{st}$ Mode to a $2^{nd}$ Mode. The $2^{nd}$ Mode can be a simplified editing mode, a full editing mode, or another type of mode.

In other implementations, the process 400 can exclude some of the operations 402-410. For example, the process 400, at 406, can omit receiving the change request. The process 400, at 408, can deactivate a work area based, instead, on receiving a mode-change request, at 410, for instance.

The process 400, at 412, receives a request indicating a change to use of a tool, similarly to the request received by the process 400, at 406. In the example given in the state information 450, the process, at 412, receives a request indicating a change to use of the Bluer Sky tool. The Bluer Sky tool was the tool selected in prior operations of the process 400. In addition, the process 400, at 404, associated the Sky work area with the Bluer Sky tool.

The process 400, at 414, determines an active work area based on a work area associated with a tool. In specific, the tool which was indicated would be used at 412. Determining the active work area can include finding out whether a work area is associated with the tool being selected. Determining can also potentially include deciding whether, e.g., based on settings, a work area should be made active at all.

The process 400, at 416, selects the active work area. Selecting the work area can benefit a user by restoring a context (e.g., the active work area) when the user is likely to want it restored. Using the exemplary state information 450, the process 400, at 416, selects the Sky work area as the active work area. Since the process 400, at 412, received an indication of change to use of the Bluer Sky tool, in all likelihood, the Sky work area is where the user wants to again work. This can benefit the user by enabling refinement of adjustments previously applied relative to the Sky work area rather than having to start from scratch, creating of a new work area, or modifying a work area other than one including the previous adjustments.

Figure 5A:
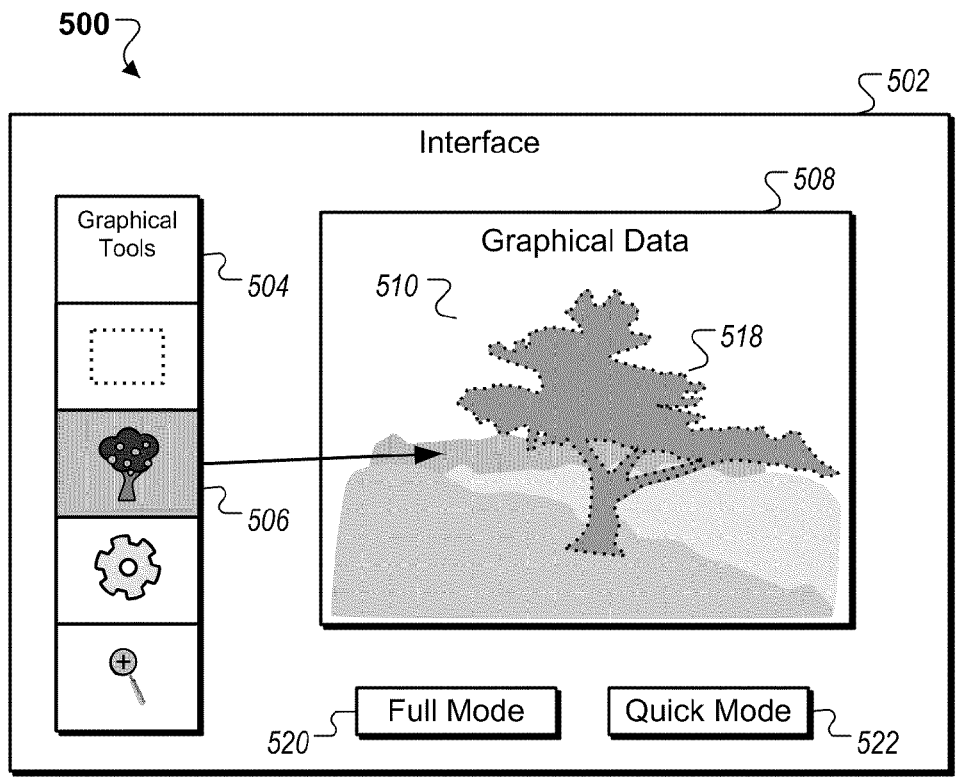
FIG. 5A is a block diagram showing an example interface for mode-based editing.

FIG. 5A is a block diagram 500 showing an example interface 502 for mode-based editing. The interface 502 includes a toolbar 504 of graphical tools, which can provide options of tools for a user to select. The interface 502 also includes a visual representation of graphical data 508. The graphical data 508 includes an exemplary depiction of a landscape 510.

The toolbar 504 can include many tools for editing graphical data. For example, the toolbar 504 can include tools for selecting regions of graphical data. Other tools available through the toolbar 504 can modify the graphical data 508, or a work area 518 corresponding to a portion of the graphical data. Besides a toolbar 504, an interface 502 can provide other techniques for a user to select tools such as menus or keyboard shortcuts.

The toolbar 504 can include, for example, a tool 506 used to modify graphical representations of trees, such as in the landscape 510. The tree tool 506 can be associated with a work area 518 including a representation of a tree. The tree tool 506 can include specialized operations for isolating tree representations in the graphical data 508. For example, a user can paint with a tree tool 506 on the tree. An image editor can automatically select the region of the graphical data corresponding to a tree, and create a work area 518 based on the selection. Finally, the editor can apply graphical operations associated with the tool 506 to the work area 518.

When another tool is selected from the toolbar 504, the image editor can enter a different mode. Alternatively, a user can specifically request a mode change through a mode-change button, such as the Full Mode button 520 or Quick Mode button 522.

Figure 5B:
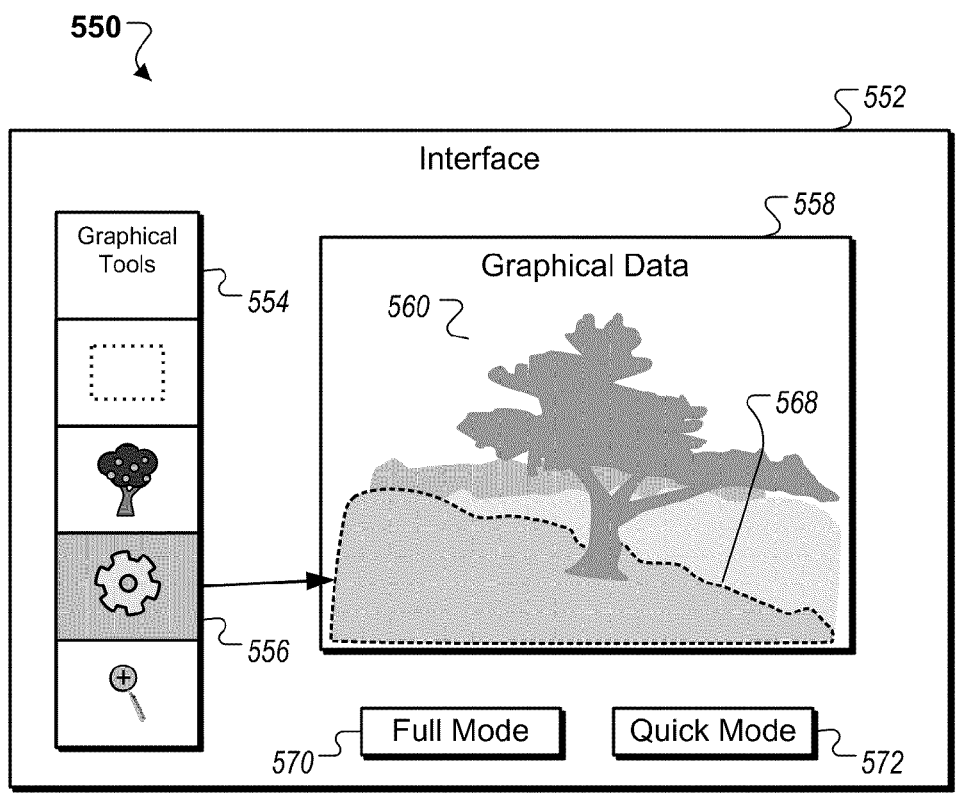
FIG. 5B is a block diagram showing an example interface for mode-based editing.

FIG. 5B is a block diagram 550 showing an example interface 552 for mode-based editing. The interface 552 includes graphical data 558 representing a landscape scene 560. The interface 552 also includes buttons 570 and 572 for explicitly requesting a mode change.

The interface 552 represents the interface 502, in FIG. 5A, after a mode change and a new tool 556 is selected from the toolbar 554. Relative to the graphical data 558, a work area 568, associated with the new tool 556, can become active for editing with the new tool 556 when the new tool 556 is selected.

As shown in FIG. 5B, even when a different work area (e.g., the work area 518 in FIG. 5A) is active, or no work area is active, selecting a tool 556 having an associated work area 568 can result in the associated work area 568 becoming active.

Figure 6:
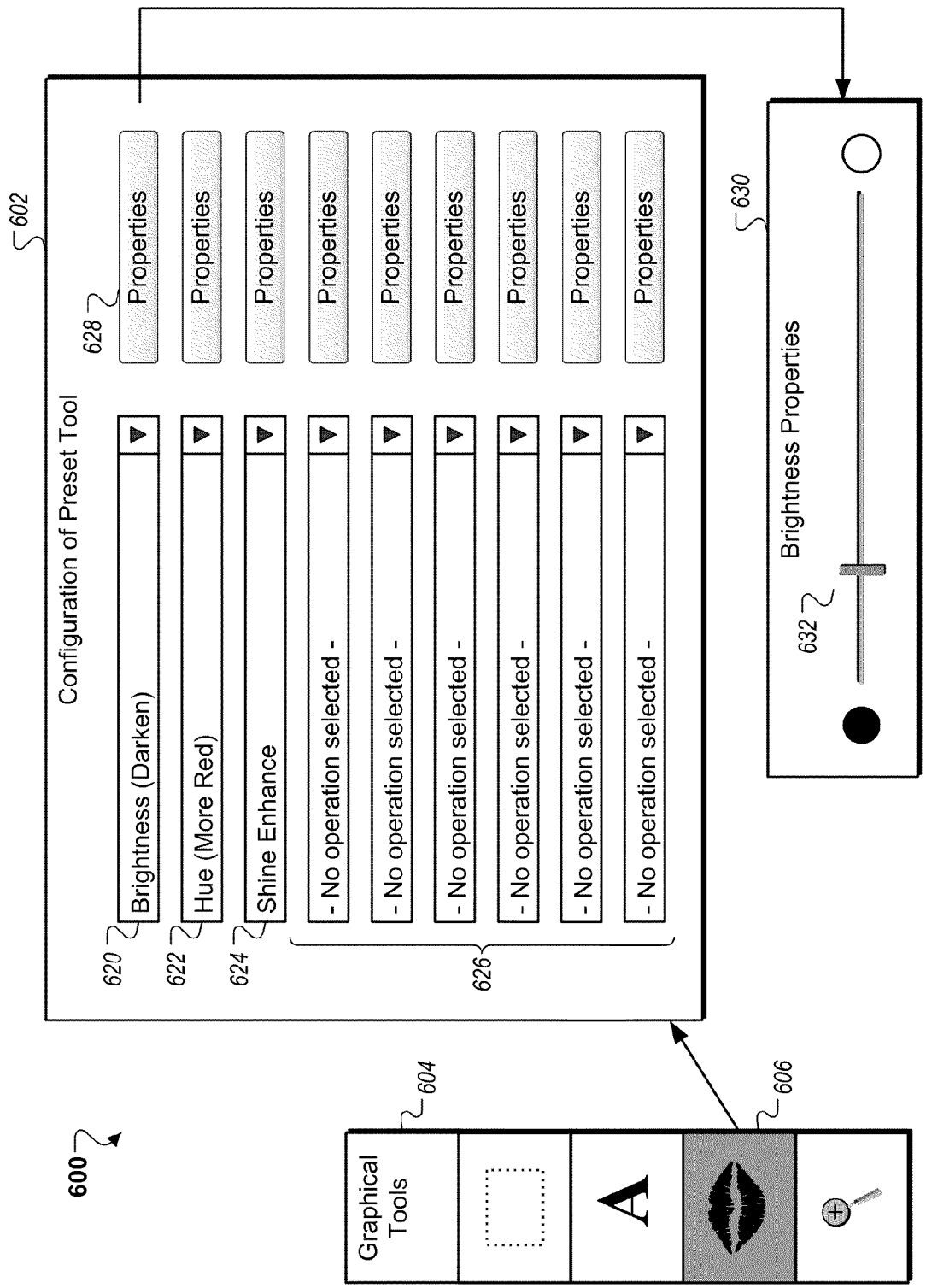
FIG. 6 is a block diagram showing an example interface for configuring a preset tool.

FIG. 6 is a block diagram 600 showing an example interface 602 for configuring a preset tool 606. In general, a preset tool 606 can be a tool for applying a predetermined set of graphical operations to graphical data. The predetermined set can be included with commercial software and then be configured by a user. In addition, a user can create a tool from scratch and determine the operations to be applied with the tool. A user interface can be provided for creating and configuring preset tools. Alternatively, or in addition, a user can modify or create configuration files (e.g., XML files) on which a preset tool is based.

As shown in FIG. 6, the preset tool 606 can be selected by the user through a toolbar 604. In addition, a user can select preset tools through menus, fly-out toolbars, and through keyboard shortcuts. The toolbar 604 can be configured to only provide access to tools included with commercial software. The toolbar 604 can also provide access to included tools which have been configured by the user. For example, a lipstick tool 606 can be included with commercial software. If the tool's 606 configuration is changed, selecting the tool 606 through the toolbar 604 can result in the changed tool being applied.

Additionally, an image editor can provide further configurability. For example, an image editor can provide sub toolbars relative to the toolbar 604 for selecting a variation of a tool 606, such as versions included with the software and user-created versions. Software can include a lipstick tool with pink, bright red, and dark red variations. A user can then create black and brown variations. Furthermore, an image editor can provide the ability for a user to add new tools to the toolbar 604 and supply an icon to display on the toolbar 604.

The interface 602 can be opened by the user relative to a preset tool 606 on toolbar 604. The interface 602 can be opened through the toolbar 604 (e.g., by pressing the Ctrl key while clicking on a tool). The interface 602 can also be opened through menus (e.g., through a Tools menu and Properties submenu).

The interface 602 shows an example of configuring a set of graphical operations associated with a preset tool 606. In the example, a user can select a graphical operation from a dropdown menu 620, such as a brightness operation. By clicking on the associated properties button 628, the user can be given additional configuration options relating to the operation selected. Through interface 630 a user can select properties of the brightness operation using a slider 632, such as selecting whether the operation should brighten or darken.

The preset tool 606 can also apply additional operations such as a hue adjustment, as selected with the dropdown 622, and shine enhancement, as selected with the dropdown 624. Through the interface 602, a variable number of operations can be associated with the preset tool 606, as shown by the additional dropdowns 626.

Through a preset tool 606 a user can efficiently apply a set of operations to graphical data, and can avoid having to apply several often repeated operations one by one.

When a preset tool 606 is directed to a specific graphical subject matter, visual implications of the subject matter can allow for a coherent set of operations to be selected. For example, the preset tool 606 can be a lipstick tool specialized to make lips to which it is applied appear to have lipstick. By knowing the type of use to which the tool 606 will be placed (e.g., to lips), the types of corrections implied by the use can be setup in advance (e.g., by a creator of software or a software user).

Figure 7:
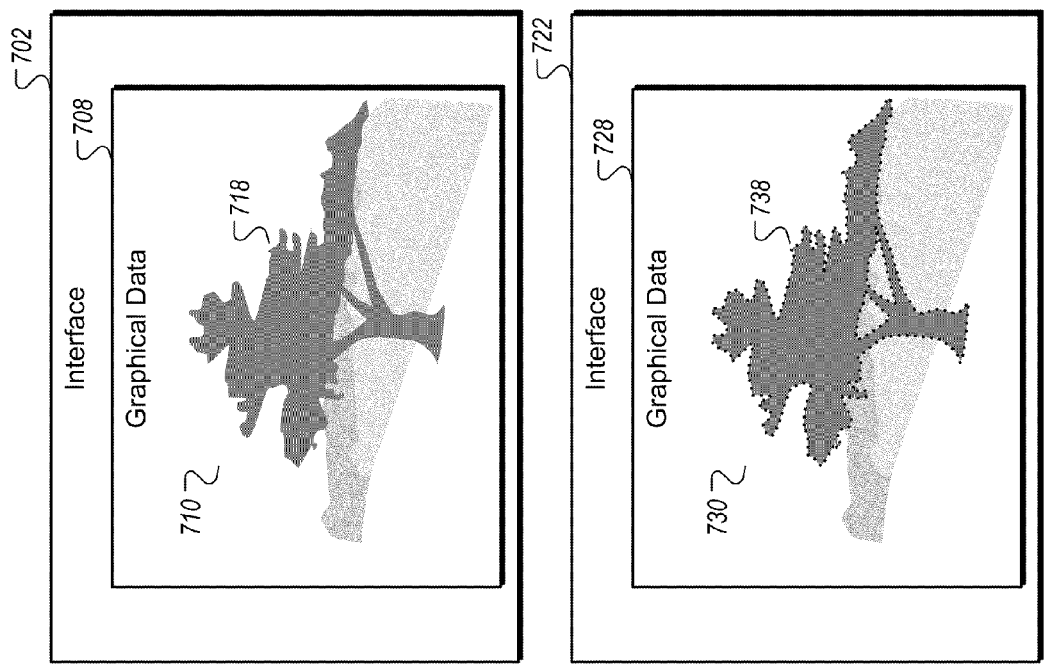
FIG. 7 is a block diagram showing example interfaces and for mode-based graphical editing.
Figure 7:
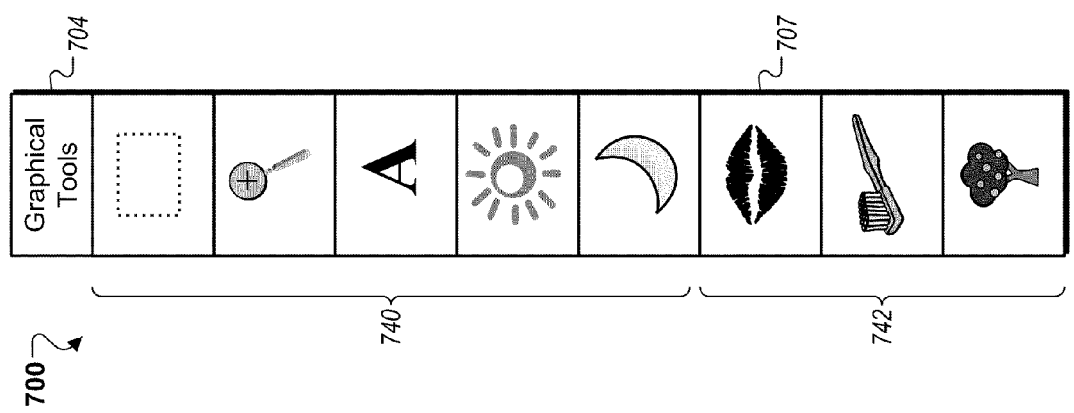

FIG. 7 is a block diagram 700 showing example interfaces 702 and 722 for mode-based graphical editing. The interface 702 includes graphical data 708 representing a landscape scene 710. Similarly, the interface 722 includes graphical data 728 representing a landscape scene 730.

The interfaces 702 and 722 can be associated with a toolbar 704 allowing a user to choose a tool to apply from a selection of graphical tools. The tools available can be categorized. For example, some tools can be simple editing tools which apply a single graphical operation. Some tools can be meta-editing tools and not directly alter graphical data. Instead, these tools can relate to indicating regions of the graphical data, such as graphical data 708 or 728, to which subsequent operations should be applied. These tools can also include operations relating to altering the editing environments, such as zooming in on graphical data. In addition, other tools can be preset tools that apply a set of operations with one tool, as described above.

The toolbar 704 includes a first group of tools 740 that can include single operation tools and meta-editing tools. A second group of tools 742 can include preset tools, such as a lipstick tool 707. The groups 740 and 742 of tools can be made available based on the mode of the image editor. For example, the group of preset tools 742 can be available in a quick-edit mode. Since the preset tools 742 can simplify and improve the efficiency of common tasks, including these tools 742 in a quick-edit mode is especially appropriate. Additional tools providing more fine-grained control, such as the first group of tools 740, can be made available in a full-edit mode. Thus, a user can gain access to all the control desired by entering the full-edit mode, but can avoid details by entering a quick-edit mode.

In a quick-edit mode, it may be desirable to hide a visual indication of a work area, described above. A visual indication, such as the dashed border (i.e., marching ants) designating the work area 738 relative to graphical data 728, can confuse novice users and be unnecessary based on the tools available. The work area 718, relating to the graphical data 708, included with interface 702, shows an example of a work area 718 without the visual indication. Advantageously, the work area 718 can appear to be part of the graphical data 708 for simpler editing not requiring an understanding of work areas.

In addition to full- and quick-edit modes, other types of modes can be provided. For example, selecting one of the preset tools 742 can place a user in a preset tool mode. Selecting a non-preset tool, such as the first group of tools 740, can place a user in a non-preset tool mode. In these modes, the number of tools available to the user can be the same from one mode to the other, in contrast to modes such as full- and quick-edit modes.

In these other types of modes, an editor can selectively display a visual indication of a work area based on the type of tool being used. For example, selecting a tool from the first group of tools 740, can remove the visual indication associated with the work area 718, as shown in the interface 702. When a tool from the preset tools 742 is selected, the visual indication can again be displayed, as shown relative to the work area 738.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method performed by a computer programmed to provide tools for graphical editing of image data, the method comprising:
　　receiving an initial request to apply a first graphical editing tool to a first work area corresponding to a portion of graphical data to be edited;
　　responsive to receiving the initial request, associating the first graphical editing tool with the first work area and selecting a layer of the first work area as the active work area for editing, the layer of the first work area being a copy of the portion of graphical data to be edited;
　　receiving a request to apply a second graphical editing tool, the second graphical editing tool being associated with a second work area corresponding to another portion of graphical data to be edited;
　　responsive to receiving the request to apply the second graphical tool, deactivating the layer of the first work area and selecting a layer of the second work area as the active work area for editing, the layer of the second work area being a copy of the another portion of graphical data to be edited;
　　receiving a subsequent request to apply the first graphical editing tool; and
　　responsive to receiving the subsequent request to apply the first graphical editing tool, deactivating the layer of the second work area and selecting the layer of the first work area as the active work area for editing.

2. The method of claim 1, wherein the first graphical editing tool is configured to apply a predetermined set of graphical operations.

3. The method of claim 2, wherein the predetermined set of graphical operations comprises a set configurable by an end user.

4. The method of claim 1, wherein receiving the request to apply the second graphical editing tool comprises receiving a request explicitly indicating a change in editing mode.

5. The method of claim 1, wherein receiving the request to apply the second graphical editing tool comprises receiving a request indicating a change in editing mode from a first editing mode to a second editing mode differing in complexity.

6. The method of claim 1, further comprising displaying a visual indication of one of the first work area or the second work area, when selected as the active work area.

7. The method of claim 1, further comprising associating the first graphical tool with multiple work areas, and responsive to receiving the subsequent request to apply the first graphical tool, selecting the most recently modified area associated with the first graphical tool as the active work area.

8. A computer program product, encoded on a non-transitory computer-readable medium, executable by one or more processors operable to cause a computing device to perform operations comprising:
　　receiving, by the computing device, an initial request to apply a first graphical editing tool to a first work area corresponding to a portion of graphical data to be edited;
　　responsive to receiving the initial request, associating, by the computing device, the first graphical editing tool with the first work area and selecting a layer of the first work area as the active work area for editing, the layer of the first work area being a copy of the portion of graphical data to be edited;
　　receiving, by the computing device, a request to apply a second graphical editing tool, the second graphical editing tool being associated with a second work area corresponding to another portion of the graphical data to be edited;
　　responsive to receiving the request to apply the second graphical tool, deactivating, by the computing device, the layer of the first work area and selecting a layer of the second work area as the active work area for editing, the layer of the second work area being a copy of the another portion of graphical data to be edited;
　　receiving, by the computing device, a subsequent request to apply the first graphical editing tool; and
　　responsive to receiving the subsequent request to apply the first graphical editing tool, deactivating, by the computing device, the layer of the second work area and selecting the layer of the first work area as the active work area for editing.

9. The computer program product of claim 8, wherein the first graphical editing tool is configured to apply a predetermined set of graphical operations.

10. The computer program product of claim 9, wherein the predetermined set of graphical operations comprises a set configurable by an end user.

11. The computer program product of claim 8, wherein receiving the request to apply the second graphical editing tool comprises receiving a request explicitly indicating a change in editing mode.

12. The computer program product of claim 8, wherein receiving the request to apply the second graphical editing tool comprises receiving a request indicating a change in editing mode from a first editing mode to a second editing mode differing in complexity.

13. The computer program product of claim 8, the operations further comprising displaying a visual indication of one of the first work area or the second work area, when selected as the active work area.

14. The computer program product of claim 8, further comprising associating the first graphical tool with multiple work areas, and responsive to receiving the subsequent request to apply the first graphical tool, selecting the most recently modified area associated with the first graphical tool as the active work area.

15. A system comprising:
　　a user interface device; and
　　one or more computers operable to interact with the user interface device and to perform operations comprising:
　　　　receiving an initial request to apply a first graphical editing tool to a first work area corresponding to a portion of graphical data to be edited;
　　　　responsive to receiving the initial request, associating the first graphical editing tool with the first work area and selecting a layer of the first work area as the active work area for editing, the layer of the first work area being a copy of the portion of graphical data to be edited;
　　　　receiving a request to apply a second graphical editing tool, the second graphical editing tool being associated with a second work area corresponding to another portion of the graphical data to be edited;

responsive to receiving the request to apply the second graphical tool, deactivating layer of the first work area and selecting a layer of the second work area as the active work area for editing, the layer of the second work area being a copy of another portion of graphical data to be edited;

receiving a subsequent request to apply the first graphical editing tool; and responsive to receiving the subsequent request to apply the first graphical editing tool, deactivating the layer of the second work area and selecting the layer of the first work area as the active work area for editing.

16. The system of claim 15, wherein the first graphical editing tool is configured to apply a predetermined set of graphical operations.

17. The system of claim 16, wherein the predetermined set of graphical operations comprises a set configurable by an end user.

18. The system of claim 15, wherein receiving the request to apply the second graphical editing tool comprises receiving a request explicitly indicating a change in editing mode.

19. The system of claim 15, wherein receiving the request to apply the second graphical editing tool comprises receiving a request indicating a change in editing mode from a first editing mode to a second editing mode differing in complexity.

20. The system of claim 15, the operations further comprising displaying a visual indication of one of the first work area or the second work area, when selected as the active work area.

21. The system of claim 15, further comprising associating the first graphical tool with multiple work areas, and responsive to receiving the subsequent request to apply the first graphical tool, selecting the most recently modified area associated with the first graphical tool as the active work area.

* * * * *